(12) United States Patent
Fenizia et al.

(10) Patent No.: US 7,433,930 B2
(45) Date of Patent: Oct. 7, 2008

(54) SYSTEM AND METHOD FOR DISTRIBUTING A MEDIA CONTENT FILE OVER A NETWORK

(75) Inventors: Luciano Fenizia, Naples (IT); Adele Trombetta, Meta (IT)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 10/690,016

(22) Filed: Oct. 21, 2003

(65) Prior Publication Data

US 2004/0148399 A1 Jul. 29, 2004

(30) Foreign Application Priority Data

Oct. 25, 2002 (EP) .................................. 02368117

(51) Int. Cl.
*G06F 15/16* (2006.01)
(52) U.S. Cl. ....................................... 709/217; 709/227
(58) Field of Classification Search ................. 709/217, 709/227; 725/86–104
See application file for complete search history.

(56) References Cited

U.S. PATENT DOCUMENTS

| | | | | |
|---|---|---|---|---|
| 5,694,334 | A * | 12/1997 | Donahue et al. ............. | 709/247 |
| 6,357,010 | B1 * | 3/2002 | Viets et al. ..................... | 726/4 |
| 6,502,137 | B1 * | 12/2002 | Peterson et al. ............. | 709/229 |
| 6,978,373 | B1 | 12/2005 | Hild et al. .................... | 713/182 |
| 7,065,341 | B2 * | 6/2006 | Kamiyama et al. .......... | 455/411 |
| 7,107,267 | B2 * | 9/2006 | Taylor .......................... | 707/8 |
| 2001/0016869 | A1 * | 8/2001 | Baumeister et al. ......... | 709/203 |
| 2002/0062357 | A1 * | 5/2002 | Srinivasan ................... | 709/219 |
| 2002/0120763 | A1 * | 8/2002 | Miloushev et al. .......... | 709/230 |
| 2003/0158816 | A1 * | 8/2003 | Rouse ......................... | 705/51 |

FOREIGN PATENT DOCUMENTS

CN 1314754 A 9/2001

* cited by examiner

*Primary Examiner*—Jeffrey Pwu
*Assistant Examiner*—Brian P Whipple
(74) *Attorney, Agent, or Firm*—Steven E. Bach; Arthur Samodovitz

(57) ABSTRACT

A customer computer accesses, through a network, a media content file, as follows. A session is opened between a customer computer and either an application server or a media content server. A request to view a media content file is received from the computer. A temporary metafile having a temporary metafile name is created. The metafile contains a network address where the media content file can be obtained, an encrypted name of the media content file and an unencrypted file path leading to the media content file. The temporary metafile name is sent to the customer computer. The customer computer requests the temporary metafile to learn the encrypted media content file name, unencrypted media content file path and the network address. The customer computer subsequently sends the encrypted media content file name and the unencrypted media content file path to the network address to obtain the media content file. The metafile is cancelled or deleted before or at the end of the session with the customer computer, for security reasons.

2 Claims, 6 Drawing Sheets

SYSTEM AND METHOD FOR DISTRIBUTING A MEDIA CONTENT FILE OVER A NETWORK

FIELD OF THE INVENTION

The present invention relates generally to computer systems, and deals more particularly with a technique to distribute data over a network which reduces the damage of pirates.

BACKGROUND OF THE INVENTION

Customers can access media content servers through the Internet and other networks to download and play media content files. Such media content files may contain digitized music, video or radio broadcasts. The customer's computer typically has media player software to allow playback of the media content. Media content is read either in real time (so called "streaming media content") or downloaded to a CDROM or hard disk from media files stored on the content servers. The streaming media players allow decompression of media content and playback in real time. The streaming media player software can be integrated into the subscriber computer browser or can be downloaded from the media content server as a "plug-in". RealNetworks, Inc. provides such a streaming media player called "RealPlayer". Likewise, Microsoft Corporation provides a streaming media player called "Windows™ Media Player". The media content servers also offer sets of programs to create a media content file and broadcast the medial content file to other service subscribers.

Typically, the customer must request a media content file from the media content server. Other, related messages are exchanged before the media content file is downloaded to the customer's computer. These messages are subject to piracy, and the pirates may use information in the messages to improperly obtain a copy of the media content file. An existing process for obtaining a media content file is as follows. A customer browser, media player builds and sends to a media content server a URL which includes a name of the desired media content file and a file path identifying the file name. The following is an example:

Rtsp://m1.media.tele.net:554/archive/film1.rm.

In the foregoing example, "Film1" is the name of the desired media content file, and "tele.net:554/archive/film1.rm" is the complete file path. Unfortunately, a pirate can likewise obtain this media content file by simply copying this link into the pirates media content player. Moreover, a pirate can obtain other media content files from the same content server location by figuring-out the naming convention of the media content files, and modifying the foregoing media content file name in accordance with the naming convention. For example, the pirate may try the same URL with "film2" or "film3" instead of "film1" to obtain media content files "film2" and "film3".

One existing solution to hamper the pirate is to use '.js' files containing JavaScript functions that dynamically build the full file path and file name of the media content file. However, there are limitations to this protection technique. Java script files are visible, and if the file name is not included in the URL, the location of the file name can be calculated by reading the '.js' file. The '.js' files can be easily downloaded from the content media server site. If the pirate writes the '.js' URL in the address box of the pirate's browser, the browser automatically downloads the file onto the pirate's computer. If the pirate reads the '.js' code, the pirate can easily deduce the name of the media content file. If the pirater reads the '.js' code, the pirate can figure-out the naming convention (typically static) used in the media content archive. If the pirate reads the '.js' code, the pirate can distribute this information, cracking the system security.

Also, it was known to hamper piracy of a media content file by encrypting the content of the file before transmission to the customer. The encryption is performed at the media content server, and the file is subsequently decrypted by the customer computer using a decryption key supplied to the authorized customer. Unfortunately, sophisticated hardware and software are required to encrypt and later decrypt the media content files. Also, typically, the encryption key is large which compounds the effort. The servers may have the CPU resources necessary for the encryption, but the customer computer may not. Also, the foregoing encryption technique does not prevent piracy of media content files if their unencrypted form can be accessed.

An object of the present invention is to protect media content files from piracy.

Another object of the present invention is to protect media content files from piracy, with minimal burden to the media content server and the customer computer.

SUMMARY OF THE INVENTION

The invention resides in a system, method and computer program product for providing a customer computer with access, through a network, to a media content file. A session is opened between a customer computer and either an application server or a media content server. A request to view a media content file is received from the computer. A temporary metafile having a name is created. The metafile contains a network address where the media content file can be obtained and an encrypted file name leading to the media content file. The temporary metafile name is sent to the customer computer. The metafile is cancelled or deleted before or at the end of the session with the customer computer.

According to features of the present invention, the temporary metafile also contains an encrypted name of the media content file. The customer computer requests the temporary metafile to learn the encrypted media content file name and the relative path of the file.

According to other features of the present invention, there is a naming convention to determine unencrypted names of said media content files, at said network address. The naming convention is not apparent from encrypted names of the media content files.

According to other features of the present invention, the name of the temporary metafile is dynamic and is based on characteristics of the current session. When the current session ends, the temporary metafile is deleted.

The present invention prevents a pirate from learning the real media content file name and the real path to the media content file. Also, the media file naming convention cannot be determined from the encrypted media content file names. The only risk is that the pirate may be able to play the media content file during the session of the authorized user. However, even this requires that the pirate quickly learn and reuse the metafile name (because the metafile name has a short duration). After the session of the authorized user, the metafile is no longer usable. The same meta file name will not be reused because it is based on characteristics (such as the sessionID) of the current session.

DETAILED DESCRIPTION OF THE PREFERRED EMBODIMENT

Figure 1:
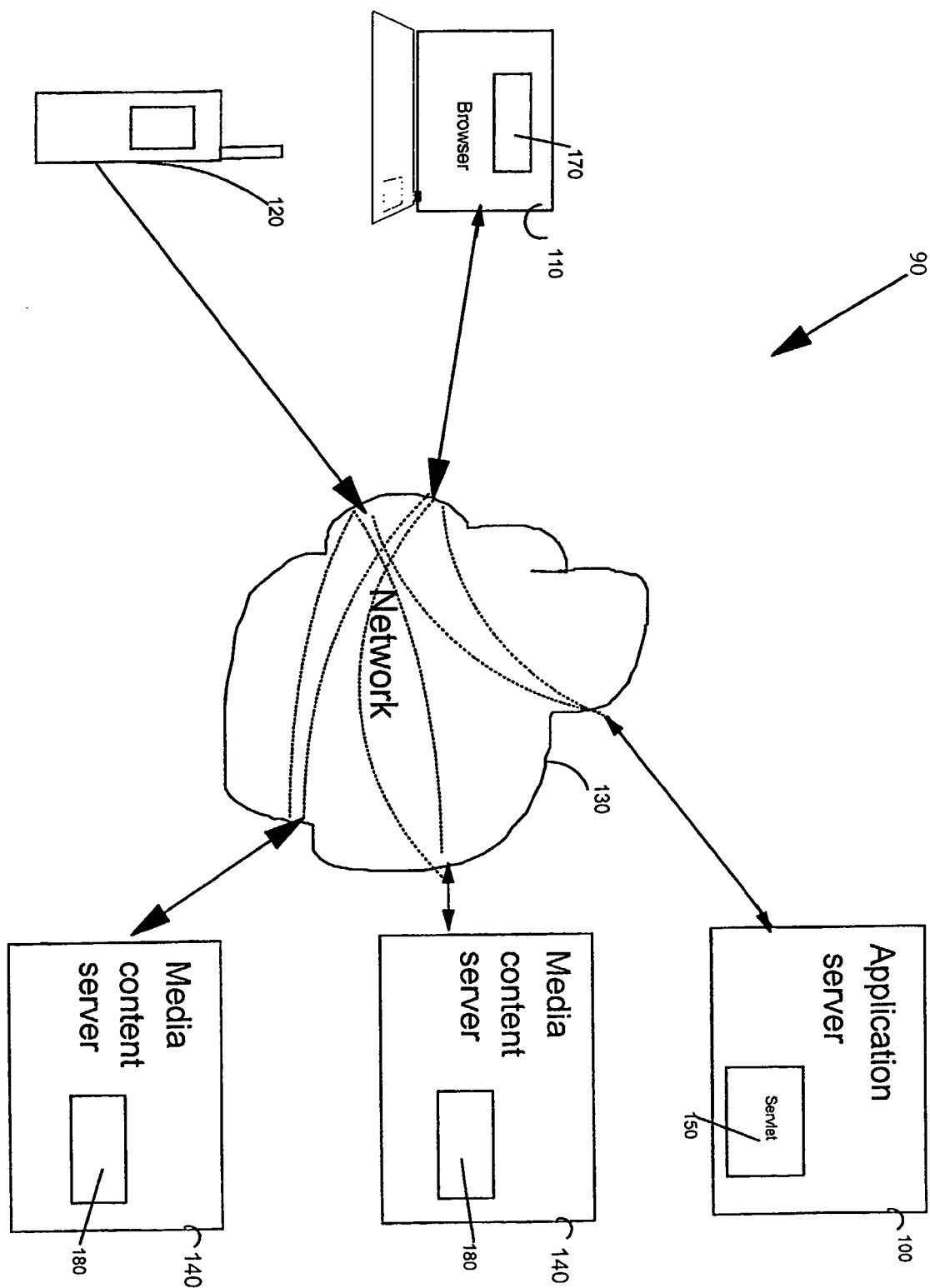
FIG. 1 illustrates a computer system which includes the present invention.

Referring now to the drawings in the detail wherein like reference numbers indicate like elements throughout, FIG. 1 illustrates a computer system generally designated 90 which includes the present invention. Within computer system 90, customer computers 110 and 120 are connected to a network 130 (such as the Internet) to access services provided by a media application server 100. The application server 100 assists its customers in downloading media content files as described below. Where a customer subscribes to a multimedia content data distribution service, the data itself is collected by the service provider (i.e. the user of server 100) from the media content owners. Usually, the media content file or data is stored on a large repository in or connected to media content servers 140 or accessed by the media content servers 140 as needed through the network 130.

The messages and data flowing through the network 130 is illustrated figuratively by dotted lines in FIG. 1. The messages are exchanged between the subscriber and the application server 100 to establish a session. The data is exchanged between the subscriber and the media content servers 140 to obtain the data itself. The application server 100 also can download a browser media player for the customer computer to allow the subscriber to play media content data on the customer computer. In FIG. 1, the application server 100 is illustrated as a separate server from the media content servers 140; however, if desired, a single server can substitute for both servers 100 and 140, providing all functions of both servers.

In the preferred embodiment of the present invention, application server 100 uses a servlet 150 to manage client sessions. Also, media content servers 140,140 use a java program and java classes 180 to participate in steps 220 and 230 as described below. In the illustrated embodiment, customer computer 110 uses a media program plug-in, received from application server 100. The media program plug-in 170 is associated with a customer browser 170. Upon request by the customer computer 110 to begin a process of downloading a media content file, application server 100 invokes servlet 150 to open a respective client session with customer computer 110. The communication protocol used by the customer computer 110 and the application server 140 is not important to the present invention. By way of example, HTTP protocol can be used between the customer computer 110 and the application server 100 if the network is a TCP/IP network.

Figure 2:
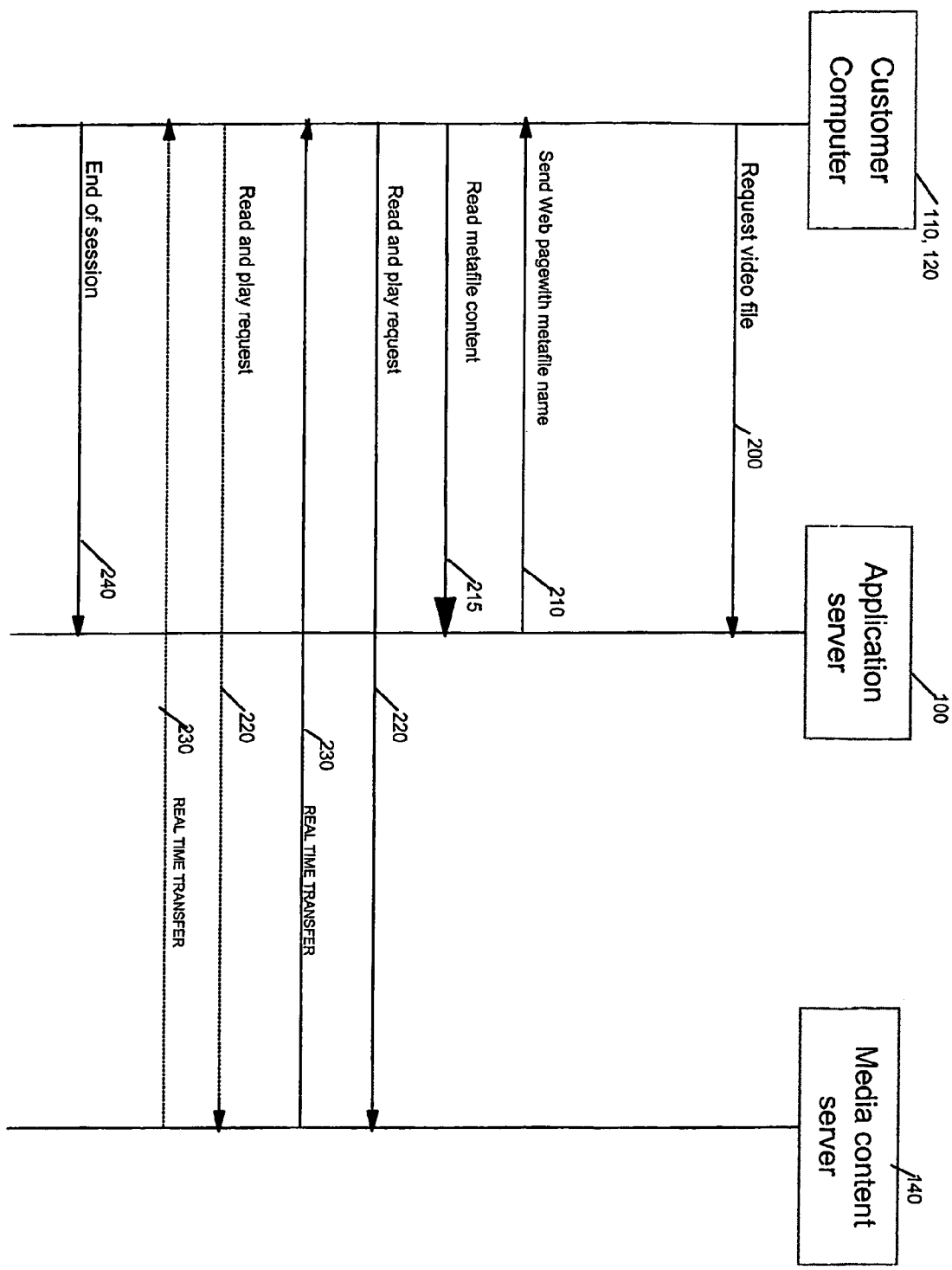
FIG. 2 illustrates message and data flow within the computer system of FIG. 1 according to the present invention.

FIG. 2 illustrates the data flow between the customer computer 110 and the servers 100 and 140. If the network 130 is the Internet, the customer browser 170 sends an HTTP request (step 200) to application server 100 which provides a media content distribution service. For example, the customer may request to access a video movie listed on a welcome web page previously furnished by application server 100 and displayed by the customer browser. In response to this request, the application server 100 authenticates the customer based on a userID and password provided with the HTTP request, determines if the customer is authorized to receive the media content file, and sends to the customer browser, a web page which include the necessary information to retrieve the media content file (step 210). In accordance with the present invention, this web page includes a name of a temporary metafile created by application server. The temporary metafile, available at the application server 100, comprises an encrypted name of the requested media content file, and an unencrypted file path for the named media content file. (The path contains the address of the media content server. The metafile name is based on customer session parameters such as a sessionID (so it is unique). In accordance with the present invention, the metafile name lasts only for the duration of the session.

The media player program within the customer computer then requests from the application server the metafile, based on the temporary metafile name (step 215). The metafile contains the encrypted name of the file, and the unencrypted file path. Then, the media player program within the customer requests the named file from the media content server 140 by specifying the encrypted file name and unencrypted file path (step 220). (Typically, the protocol between the customer computer and the media content server is specific to the media player program, and is not the usual HTTP protocol, even when the network is an IP network.) In the preferred embodiment of the present invention, the media content server 140 previously created a repository of encrypted media content file names for respective media content files; the unencrypted file names can follow a naming convention, but are encrypted according to a defined encryption key so this naming convention will not be ascertained by a pirate. In response to the customer request for an encrypted media content file name, the media content server 140 checks if the encrypted file name and path exist in its repository. If so, the media content server downloads the media content file to the customer computer (step 230). Then, media player program within the customer computer plays the media content file. The foregoing steps 200-230 can be repeated for additional media content files requested by the customer. After all the media content files have been downloaded, the customer computer sends to the application server 100 a request to end the session (step 240). In response, application server 100 deletes the temporary metafile including the metafile name, encrypted content file name and unencrypted content file path inside.

Figure 3:
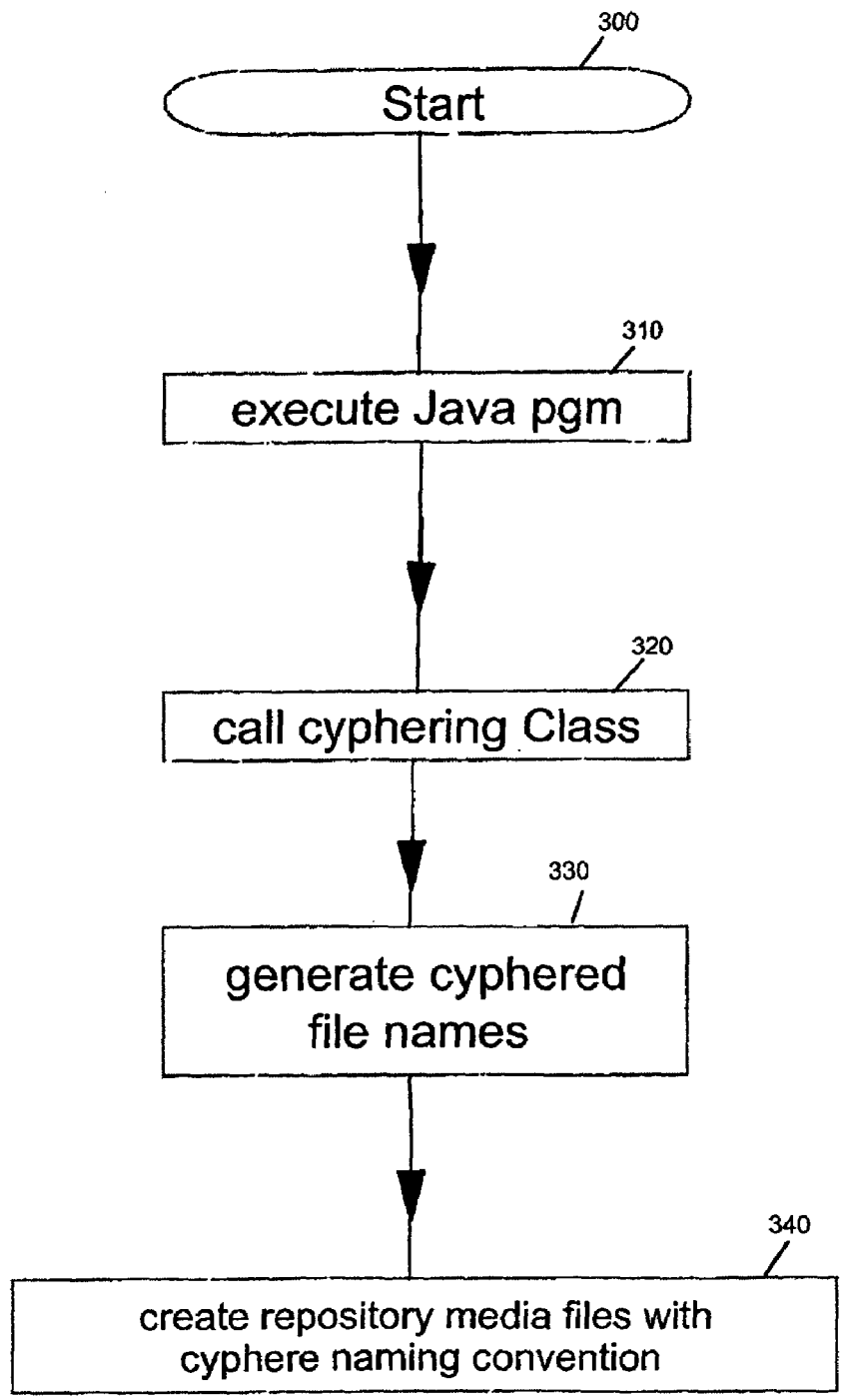
FIG. 3 is a flowchart of a process executed on a media content server within the computer system of FIG. 1.

FIG. 3 illustrates preliminary processing by the media content server 140 according to the preferred embodiment of the present invention to create the repository of encrypted content media file names and unencrypted media file paths. In step 300, media content server 140 invokes a Java program (step 310), but the encryption program can start also in batch mode. In the preferred embodiment of the present invention, the Java program calls an encryption class object (step 320). The encryption class object encrypts media content file names (step 330) obtained from a source (as a file list or other). The encryption of each file name is applied on a set of files that can follow a naming convention. Therefore, the naming convention, even if known by a pirate, cannot be applied by the pirate without first decrypting the file name. Therefore, even if a pirate intercepts an encrypted content file name, transferred from the application server 100 to the customer computer or from the customer computer to the media content server 140, the pirate can only request the same content file, but no others. The encryption process according to the preferred is a standard one such as RSA. The result of the encryption step 330 is the creation of a repository 340 in the media content server 140 of encrypted media content data file.

Figure 4:
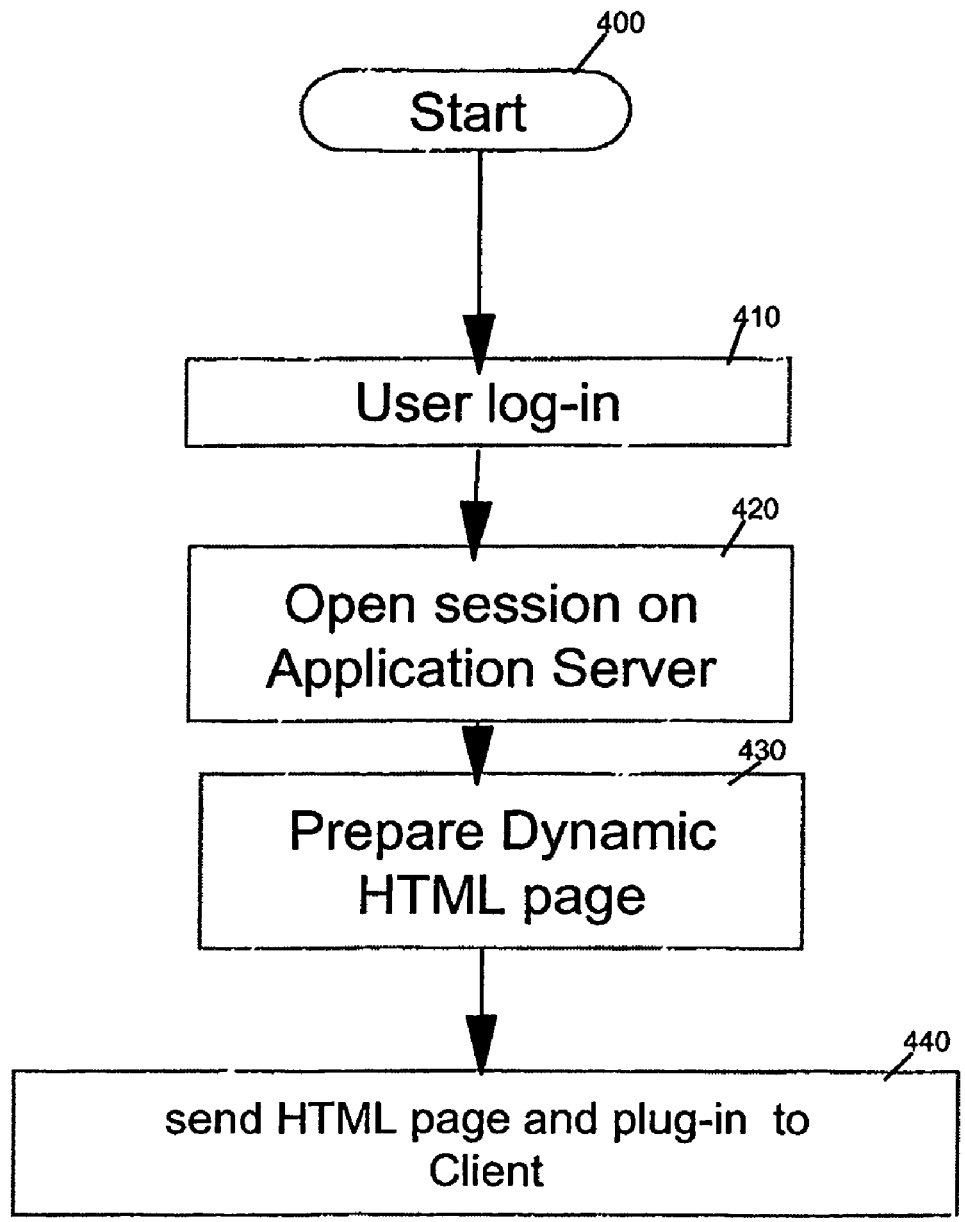
FIG. 4 is a flowchart of a process executed on an application server within the computer system of FIG. 1.

FIG. 4 illustrates, in more detail, processing by the application server 100 according to the preferred embodiment of the present invention to give the customer computer 110 access to media content files from media content server 140. Initially, an application in application server 100 is invoked to handle a user log-on session from customer computer 110 (step 400). Subsequently, the customer requests to use the media content data distribution services through an appropriate session of log-in and specifies a file name that the customer wants to download (step 410). For example, the file name can be the name of a movie selected by the customer from a list displayed by the customer's browser. The application server collects customer information and may perform authentication and authorization for the customer to determine if the customer is an authorized subscriber. Then, application server 100 opens the session, storing customer related information and assigning a session number (step 420). Then, servlet 150 retrieves from the customer request, the file name that the customer wants to access from media content server 140. The application server 100 has a table with the media content file names unencrypted and the file address in the network. Using the same encryption algorithm, the application server generates the encrypted name of the files and inserts them in the metafile. Next, servlet 150 prepares a dynamic HTML page including a variable metafile name (step 430). As explained below, this will prevent pirates from accessing media content files after the metafile is deleted even if the pirate accesses the messages exchanged between the customer computer and the application server. Step 430 is described in more detail below with reference to FIG. 5. Next, application server 100 sends the dynamic HTML page to the customer (step 440).

Figure 5:
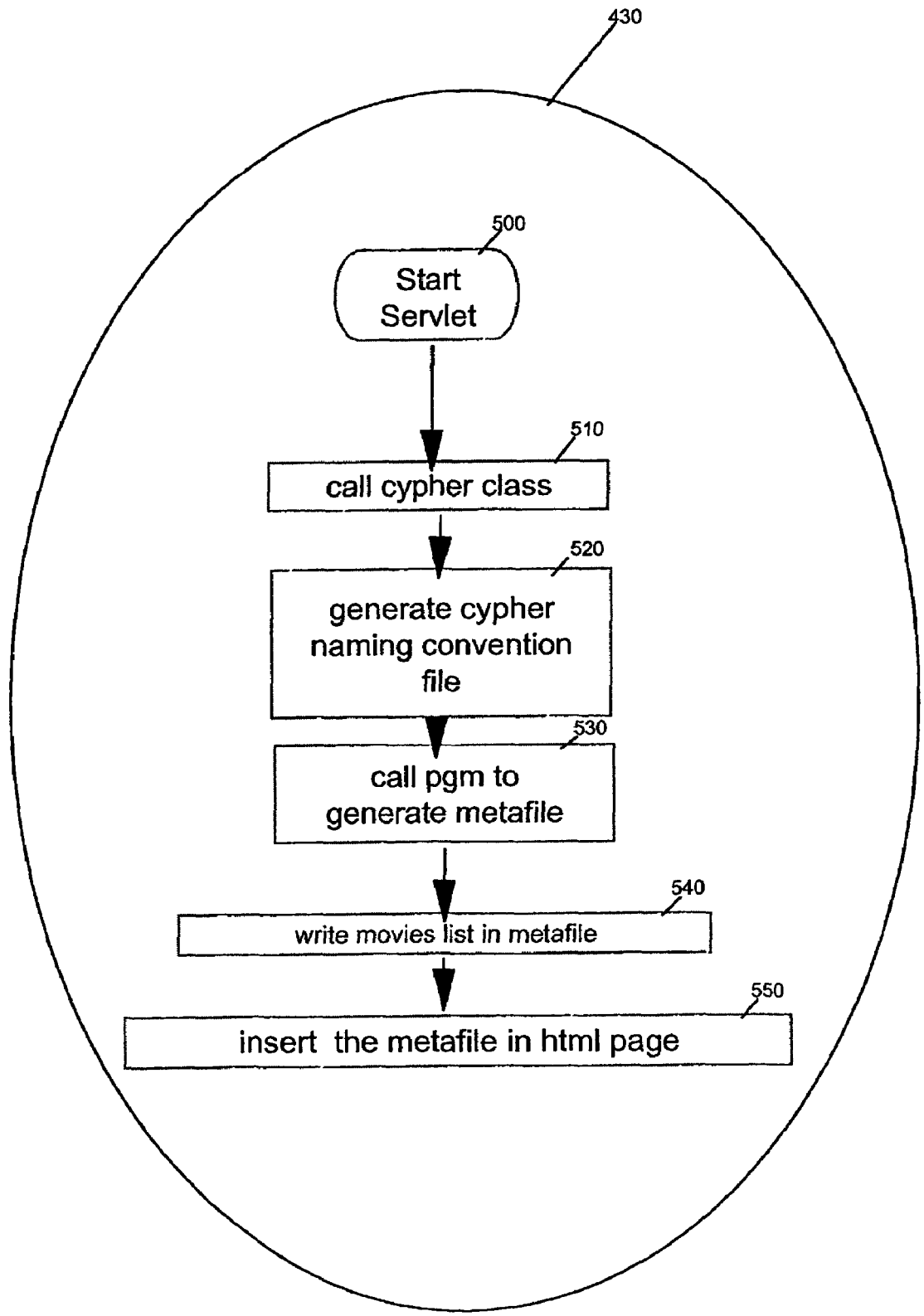
FIG. 5 is a flowchart of a process for preparing a dynamic HTML page, as part of the process executed on the application server of FIG. 4.

FIG. 5 illustrates in more detail the formation of the dynamic HTML page in step 430. An HTML page is a document written in a hypertext markup language. The browser 170 installed on customer computer connected to the IP network can read an HTML page. The HTML page is used to transfer information from the application server 100 to the customer computer, and automatically starts execution of the plug-in media player program associated with browser 170. The HTML page built in step 430 will not include the real file names or file path names but will hide them in the following way:

(a) When the customer requested to log-in in step 410, the application server opened the session (step 420) and received the customer request for a list of media content files identified by respective names. In response, the application server reads a table providing media content file addresses corresponding to respective media content file names. For example, the table contains a movie title and the file path of the corresponding video file. The file path includes an unencrypted file name according to a naming convention and an encrypted file path on the media content server owning that file.

(b) Next, the application server servlet 150 calls an encryption class object (step 510). The same encryption class object was used by the media content server 140 to build the repository of encrypted media content data file names as described with reference to FIG. 3. Servlet 150, with the help of the encryption class object, then computes the encrypted name for each file requested by the customer (step 520).

(c) Next, servlet 150 calls another object to create a temporary metafile (step 530). A metafile is a file containing information defining other files. For example, the media player protocol of Real Networks Inc., uses '.ram' metafiles to store information about files to be played. According to the preferred embodiment of the present invention, the name of the temporary metafile depends on temporary parameters such as the subscriber session parameters (such as a session number assigned by the application server 100) and the date and time of session opening. The advantage of having a temporary file name is that a pirate who steals it from a message can only use it during the duration of the session. Because the file names inside the metafile are encrypted, the origin of the file cannot be easily identified thereafter.

(d) Next, servlet 150 writes into the metafile, the encrypted file name, the path and the unencrypted address of the media content server containing these files (step 540).

(e) Next, servlet 150 builds the HTML page including the metafile name (step 550).

The following is an example of an HTML page built according to the preferred embodiment of the present invention. The HTML page contains video file references to be used by the customer computer browser and the media player plug-in for requesting and playing media content data files ("audio/x-pn-realaudio-plugin"). Instead of referring directly to a media content data file name and path, the page refers to a temporary, encrypted metafile name (DW1EQ0LKL12BWM0ZBV25NBI.ram). The temporary metafile name does not reveal the naming convention on the media content server:

```
<EMBED SRC=/CMCache/DW1EQ0LKL12BWM0ZBV25NBI.ram" WIDTH=160
HEIGHT=120 NOJAVA=true CONTROLS=ImageWindow CONSOLE=_master
type="audio/x-pn-realaudio-plugin"><br><br>
<EMBED SRC=/CMCache/DW1EQ0LKL12BWM0ZBV25NBI.ram" WIDTH=170
HEIGHT=24 NOJAVA=true CONTROLS=StatusPanel CONSOLE=_master
type="audio/x-pn-realaudio-plugin"><br>
<EMBED SRC=/CMCache/DW1EQ0LKL12BWM0ZBV25NBI.ram" WIDTH=16
HEIGHT=24 NOJAVA=true CONTROLS=RWCtrl CONSOLE=50k
type="audio/x-pn-realaudio-plugin">
<EMBED SRC=/CMCache/DW1EQ0LKL12BWM0ZBV25NBI.ram" WIDTH=70
HEIGHT=24 NOJAVA=true CONTROLS=PositionSlider CONSOLE=50k
type="audio/x-pn-realaudio-plugin">
<EMBED SRC=/CMCache/DW1EQ0LKL12BWM0ZBV25NBI.ram" WIDTH=16
HEIGHT=24 NOJAVA=true CONTROLS=FFCtrl CONSOLE=50k
type="audio/x-pn-realaudio-plugin">
<EMBED SRC=/CMCache/DW1EQ0LKL12BWM0ZBV25NBI.ram" WIDTH=26
HEIGHT=24 NOJAVA=true CONTROLS=PlayButton CONSOLE=50k
type="audio/x-pn-realaudio-plugin">
<EMBED SRC=/CMCache/DW1EQ0LKL12BWM0ZBV25NBI.ram" WIDTH=26
HEIGHT=24 NOJAVA=true CONTROLS=StopButton CONSOLE=50k
type="audio/x-pn-realaudio-plugin">
```

Figure 6:
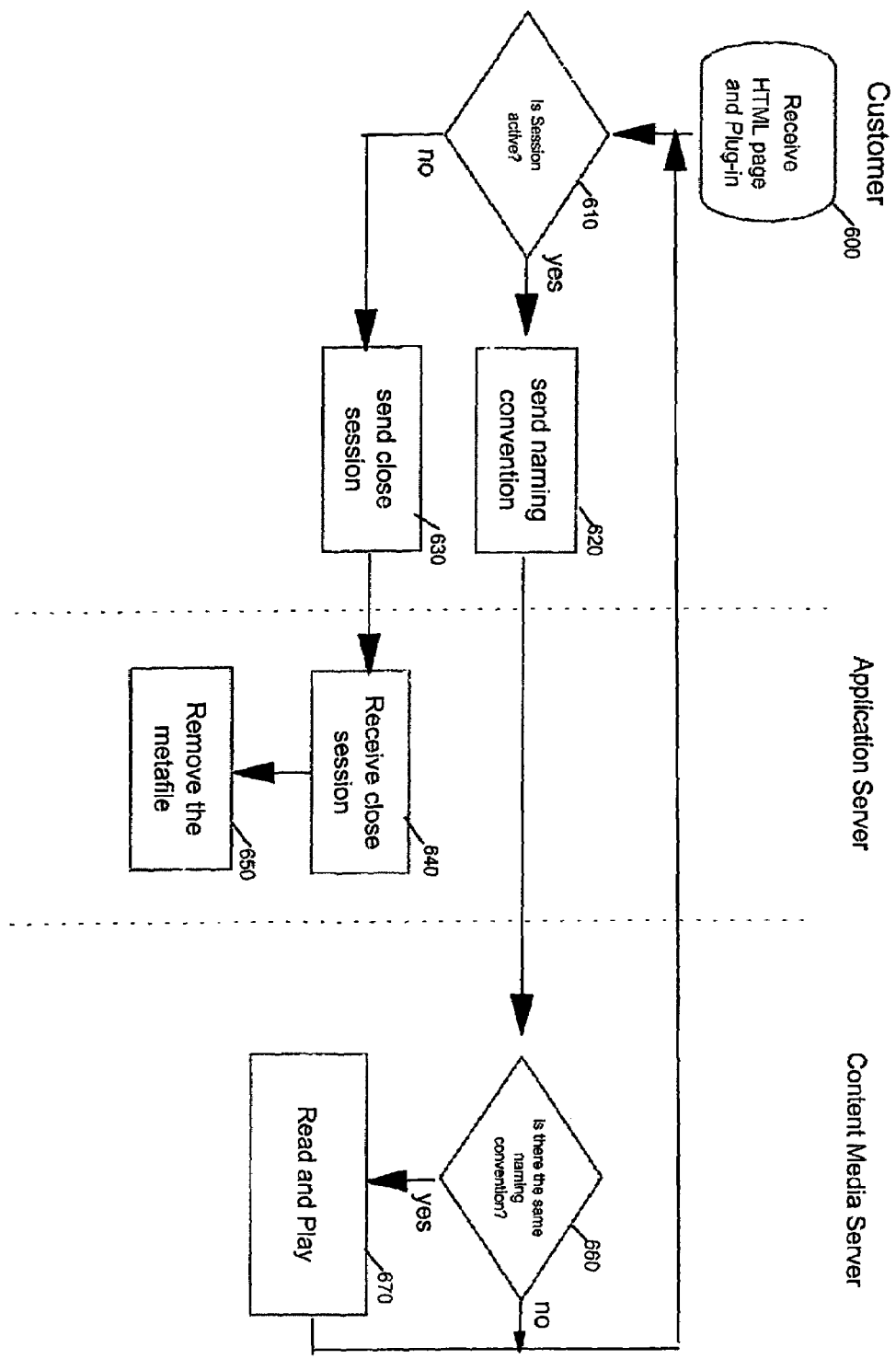
FIG. 6 is a flowchart of a process executed on a customer computer of the computer system of FIG. 1 and the media content server, according to the present invention.

FIG. 6 illustrates processing by the customer computer 110 upon receiving the HTML page built by the servlet 150, as described above with reference to FIG. 4 and FIG. 5. FIG. 6 illustrates data and message flow between the customer computer, the media content server 140 distributing the media content data files and the application server 100. After the customer computer browser 170 receives the HTML page (step 600), If the session is still active (decision 610, yes branch), the media player program in the customer computer requests the encrypted file name from the metafile contained in the application server 100. This request is made by specifying the encrypted metafile name contained in the HTML page. After receiving the encrypted file name, unencrypted file path and unencrypted media content server address from the application server 100, the media player program sends a request, using the transfer protocol of media content server 140, to play the named media content data file (step 620). In response to the request, the media content server identifies the encrypted file name and unencrypted file path included in the request. If the encrypted file name is correctly encrypted (decision 660, yes branch), the file is taken from the data base and downloaded according to the playing protocol through the network to the customer computer (step 670). The customer computer receives the data from the media content server and plays it using the media player plug-in. When the file playing is completed, if the customer maintains the session as active (decision 610, yes branch), the customer browser requests download of the next file in the same manner as described above.

Whenever the session ends, (decision 610, no branch), the customer computer sends a close session instruction to the application server 100 (step 630). Upon receiving the close session instruction (step 640), the application server 100 cancels/deletes any temporary data related to this session including the temporary metafile (step 650). The metafile will be canceled as well from the file system repertory of the application server 100. Thus, if a pirate thereafter sends the metafile name to the application server 100 to obtain the encrypted media content file name, unencrypted file path and unencrypted media server address, the application server cannot return them.

The invention claimed is:

1. A method for providing a customer computer with access, through a network, to a media content file, said method comprising the steps of:
   opening a session with the customer computer;
   receiving from the customer computer a request to view a media content file;
   creating a temporary metafile having a temporary metafile name, said metafile containing a network address where said media content file can be found, an unencrypted file path leading to said media content file, and an encrypted name of said media content file;
   sending to the customer computer the temporary metafile name;
   said customer computer requesting said temporary metafile to learn the encrypted media content file name, unencrypted media content file path and said network address, and said customer computer subsequently sending said encrypted media content file name and said unencrypted media content file path to said network address; and
   canceling or deleting the metafile before or at the end of said session with the customer computer.

2. A method for providing a customer computer with access, through a network, to a media content file, said method comprising the steps of:
   opening a session with the customer computer with an application server;
   receiving from the customer computer a request to view a media content file;
   creating a temporary metafile having a temporary metafile name, computing said metafile name based on characteristics of said customer session, said metafile containing a network address where said media content file can be found and an unencrypted file path leading to said media content file;
   sending to the customer computer the temporary metafile name;
   the customer computer:
      receiving said temporary metafile name;
      using said temporary metafile name, requesting the temporary metafile from said application server;
      sending a request to said network address to receive and play said media content file identified by said encrypted media content file name and an unencrypted media content file path; and
      receiving and playing the named media content file from said network address
   canceling or deleting the metafile before or at the end of said session with the customer computer.

* * * * *